United States Patent
Keller et al.

(10) Patent No.: US 8,908,643 B2
(45) Date of Patent: Dec. 9, 2014

(54) HANDOVER OF PRIORITY CALLS FROM A CIRCUIT SWITCHED ACCESS NETWORK WITH SINGLE RADIO VOICE CALL CONTINUITY

(75) Inventors: Ralf Keller, Wurselen (DE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 13/392,366

(22) PCT Filed: Jan. 27, 2012

(86) PCT No.: PCT/EP2012/051338
§ 371 (c)(1),
(2), (4) Date: Feb. 24, 2012

(87) PCT Pub. No.: WO2013/110345
PCT Pub. Date: Aug. 1, 2013

(65) Prior Publication Data
US 2013/0195075 A1    Aug. 1, 2013

(51) Int. Cl.
*H04J 1/16* (2006.01)

(52) U.S. Cl.
USPC ........................................... 370/331

(58) Field of Classification Search
None
See application file for complete search history.

(56) References Cited

U.S. PATENT DOCUMENTS

| 2007/0149166 | A1 | 6/2007 | Turcotte et al. | |
|---|---|---|---|---|
| 2007/0254625 | A1* | 11/2007 | Edge | 455/404.1 |
| 2009/0086674 | A1* | 4/2009 | Ejzak | 370/331 |
| 2009/0232091 | A1* | 9/2009 | Khan | 370/331 |
| 2009/0268635 | A1* | 10/2009 | Gallagher et al. | 370/254 |
| 2009/0270099 | A1* | 10/2009 | Gallagher et al. | 455/435.1 |
| 2010/0027498 | A1* | 2/2010 | Song et al. | 370/329 |
| 2010/0034166 | A1* | 2/2010 | Olvera-Hernandez | 370/331 |
| 2010/0054209 | A1* | 3/2010 | Mahdi | 370/331 |
| 2010/0124897 | A1* | 5/2010 | Edge | 455/404.1 |
| 2010/0202368 | A1* | 8/2010 | Hans | 370/329 |
| 2010/0202407 | A1 | 8/2010 | Edge | |
| 2010/0309847 | A1* | 12/2010 | Bharadwaj | 370/328 |

(Continued)

OTHER PUBLICATIONS

3GPP TS 23.237 v11.2.0; "3rd Generation Partnership Project; Technical Specification Group Services and System Aspects; IP Multimedia Subsystem (IMS) Service Continuity"; Stage 2 (Release 11); Sep. 2011; 154 pages.

(Continued)

*Primary Examiner* — Gregory Sefcheck
*Assistant Examiner* — Jael Ulysse
(74) *Attorney, Agent, or Firm* — Myers Bigel Sibley & Sajovec, P.A.

(57) ABSTRACT

A method is provided of handing over a priority call with Single Radio Voice Call Continuity, SRVCC. The priority call is handed over from a User Equipment, UE, accessing an IP Multimedia Subsystem, IMS, network via a Circuit Switched, CS, access network to a target Packet Switched, PS, access network thereby establishing a priority IMS session. The priority call has a specified CS priority level. The method includes sending a handover request from the CS access network towards the PS access network and the IMS network to transfer the priority call. A PS priority level for the session in the PS network is determined based on the specified CS priority level. Bearer resources for the IMS session are allocated. The bearer resources are based, at least in part, on the PS priority level. The call is transferred to the IMS session over the PS access network.

10 Claims, 6 Drawing Sheets

(56) References Cited

U.S. PATENT DOCUMENTS

| | | | |
|---|---|---|---|
| 2010/0311386 | A1 | 12/2010 | Edge et al. |
| 2011/0044327 | A1* | 2/2011 | Mahdi et al. ............... 370/352 |
| 2011/0069618 | A1* | 3/2011 | Wong et al. ............... 370/244 |
| 2011/0141979 | A1 | 6/2011 | Keller et al. |
| 2011/0158121 | A1* | 6/2011 | Casati et al. ............... 370/252 |
| 2011/0165856 | A1* | 7/2011 | You et al. ............... 455/404.1 |
| 2011/0170517 | A1* | 7/2011 | Bakker et al. ............... 370/331 |
| 2011/0171926 | A1* | 7/2011 | Faccin et al. ............... 455/404.1 |
| 2011/0228707 | A1 | 9/2011 | Multikainen et al. |
| 2011/0230162 | A1* | 9/2011 | Mutikainen et al. ....... 455/404.1 |
| 2011/0299429 | A1* | 12/2011 | Tiwari ............... 370/259 |
| 2012/0087339 | A1* | 4/2012 | Wu ............... 370/331 |
| 2013/0107863 | A1* | 5/2013 | Faccin et al. ............... 370/331 |
| 2013/0121334 | A1* | 5/2013 | Song et al. ............... 370/352 |
| 2013/0142168 | A1* | 6/2013 | Vedrine et al. ............... 370/331 |
| 2013/0279442 | A1* | 10/2013 | Tiwari ............... 370/329 |

OTHER PUBLICATIONS

3GPP TS 23.228 v11.2.0; "3$^{rd}$ Generation Partnership Project; Technical Specification Group Services and System Aspects; IP Multimedia Subsystem (IMS)"; Stage 2 (Release 11); Sep. 2011; 274 pages.

Change Request: 3GPP TSG-SA WG2 Meeting #88; S2-115354 TS 23.216 CR 0235 v11.2.0; "Introduction of SRVCC from CS to PS"; (Release 11); Nov. 14-18, 2011; 27 pages.

International Search Report and Written Opinion of the International Searching Authority, PCT Application No. PCT/EP2012/051338, Oct. 9, 2012.

3GPP, "3$^{rd}$ Generation Partnership Project; Technical Specification Group Services and System Aspects; Single Radio Voice Call Continuity (SRVCC); Stage 2 (Release 11)", Draft_Interim_Version_ 23216-B30+, 3$^{rd}$ Generation Partnership Project (3GPP), Mobile Competence Centre; 650, Route des Lucioles; F-06921 Sophia-Antipolis Cedex; France, Jan. 26, 2012, XP050575054, 62 pp.

3GPP, "3$^{rd}$ Generation Partnership Project; Technical Specification Group Services and System Aspects; Single Radio Voice Call Continuity (SRVCC); Stage 2 (Release 11)", 3GPP Draft; 23216-B30_ CRS_Implemented, 3$^{rd}$ Generation Partnership Project (3GPP), Mobile Competence Centre; 650, Route des Lucioles; F-06921 Sophia-Antipolis Cedex; France, Dec. 1, 2011, XP050575096, 58 pp.

Change Request 23.237 CR 0407: 3GPP TSG-SA WG2 Meeting #88, S2-115399, 3$^{rd}$ Generation Partnership Project, "Introduction of SRVCC from CS to PS" (Release 11) Nov. 14-18, 2011 San Francisco, USA (29 pages).

3GPP TS 23.167, "3$^{rd}$ Generation Partnership Project; Technical Specification Group Services and System Aspects; IP Multimedia Subsystem (IMS) emergency sessions, (Release 11)", V11.2.0 Sep. 2011 (41 pages).

International Search Report and Written Opinion of the International Searching Authority, International Application No. PCT/EP2012/051343, Oct. 10, 2012.

"3$^{rd}$ Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)", 3GPP Standard; 3GPP TR 23.885, 3$^{rd}$ Generation Partnership Project (3GPP), Mobile Competence Centre; 650, Route des Lucioles; F-06921 Sophia Antipolis Cedex; France, vol. SA WG2, No. V11.0.0, Sep. 23, 2011, pp. 1-83, XP050553882.

* cited by examiner

HANDOVER OF PRIORITY CALLS FROM A CIRCUIT SWITCHED ACCESS NETWORK WITH SINGLE RADIO VOICE CALL CONTINUITY

CROSS REFERENCE TO RELATED APPLICATION

This application is a 35 U.S.C. §371 national stage application of PCT International Application No. PCT/EP2012/051338, filed on 27 Jan. 2012, the disclosure and content of which is incorporated by reference herein in its entirety.

TECHNICAL FIELD

The present invention relates to methods and apparatus in a telecommunications network for enabling handover from a Circuit Switched (CS) to a Packet Switched (PS) access network for a priority call. More particularly, the invention relates to methods and apparatus for enabling handover of a priority call with Single Radio Voice Call Continuity, SRVCC.

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

As shown in FIG. 1, User Equipment (UE) can access the IMS by attaching to an access network and then over the Connectivity Layer 1, which is part of a PS domain. In that case an IMS session can be set up by the UE using SIP signalling. FIG. 2 illustrates schematically the main components of relevance to the present disclosure of a PS Evolved Packet Core (EPC) network in accordance with the 3GPP defined Systems Architecture Evolution (SAE), and shows a UE 20 accessing an IP network shown as the Internet 21. The principal network entities shown include a Serving Gateway (SGW) 23, a Public data network, PDN, Gateway (PGW) 24, an evolved NodeB (eNodeB) 25, a Mobility Management Entity (MME) 26 and the user's Home Subscriber Server (HSS) 27. For the purposes of the following discussion the SGW 23 and PGW 24 will be grouped together as one entity SGW/PGW.

Many existing access networks operate only using CS technology, but a UE may also access IMS services via a CS domain. Although the CS domain will not handle SIP, procedures are well established for dealing with the provision of media and services between the IMS and a UE using a CS access. There are many occasions when during a call/session it is required to transfer or hand over the call/session from one access network to another. There are a variety of factors that are used to determine when a call needs to be handed over to another access network, but these are not particularly relevant to the present discussion. All we need to know is that the CS access network determines, based on the cells for which the UE reports measurements, when the conditions arise that require a request to be made to the core network for the call to be handed over. Single Radio Voice Call Continuity (SRVCC) is described in 3GPP TS 23.237 and 3GPP TS 23.216, specifying procedures for handover of a voice call from a PS access to a CS access (e.g. transfer of a Voice-over-IP, VoIP, IMS session from an evolved Universal Terrestrial Radio Access Network, E-UTRAN, to a Universal Terrestrial Radio Access Network/GSM Edge Radio Access Network, UTRAN/GERAN). These technical specifications have also been extended to allow handover of a voice call from a CS access to a PS access.

However, the procedures specified for CS to PS handover with SRVCC do not support the transfer of a priority call. In other words, under the current procedures, if a priority call is transferred from a CS to a PS access, the transferred call would no longer be a priority call. This problem is addressed by the following discussion.

SUMMARY

A first aspect provides a method of handing over a priority call with Single Radio Voice Call Continuity, SRVCC. The priority call is handed over from a User Equipment, UE, accessing an IP Multimedia Subsystem, IMS, network via a Circuit Switched, CS, access network to a target Packet Switched, PS, access network thereby establishing a priority IMS session. The priority call has a specified CS priority level. The method includes sending a handover request from the CS access network towards the PS access network and the IMS network to transfer the priority call. A PS priority level for the session in the PS network is determined based on the specified CS priority level. Bearer resources for the IMS session are allocated. The bearer resources are based, at least in part, on the PS priority level. The call is transferred to the IMS session over the PS access network.

A second aspect provides a network server configured for use in a telecommunications network in which a priority call from a User Equipment, UE, accessing an IP Multimedia Subsystem, IMS, network via a Circuit Switched, CS, access network is to be handed over with Single Radio Voice Call Continuity, SRVCC, to a target packet Switched, PS, access network and thereby establish an IMS priority session. The network server includes a priority mapping module configured to determine a PS priority level for the IMS session based on a specified CS priority level of the call. The network server also includes an input/output for receiving a signal with an indication of the specified CS priority level of the call, and for sending a signal that includes the determined PS priority level.

A third aspect provides User Equipment, UE, configured to establish a priority call in a Circuit Switched, CS, access network, the priority call having a specified CS priority level. The UE is also configured to access an IP Multimedia Subsystem, IMS, network via the CS access network, and for the call to be handed over with Single Radio Voice Call Continuity, SRVCC, to a target packet Switched, PS, access network, thereby to establish an IMS priority session. The UE includes: an input/output for receiving and transmitting signals via the CS access network; an input/output for receiving and transmitting signals via the PS access network; a memory storing data and program instructions; and a processor. The processor is configured to process the program instructions to store in the memory an indication of an IMS priority level that corresponds to the specified CS priority level of the call, and to include the IMS priority level in IMS signalling sent to the IMS network to establish the IMS priority session with SRVCC.

DETAILED DESCRIPTION

Figure 3:
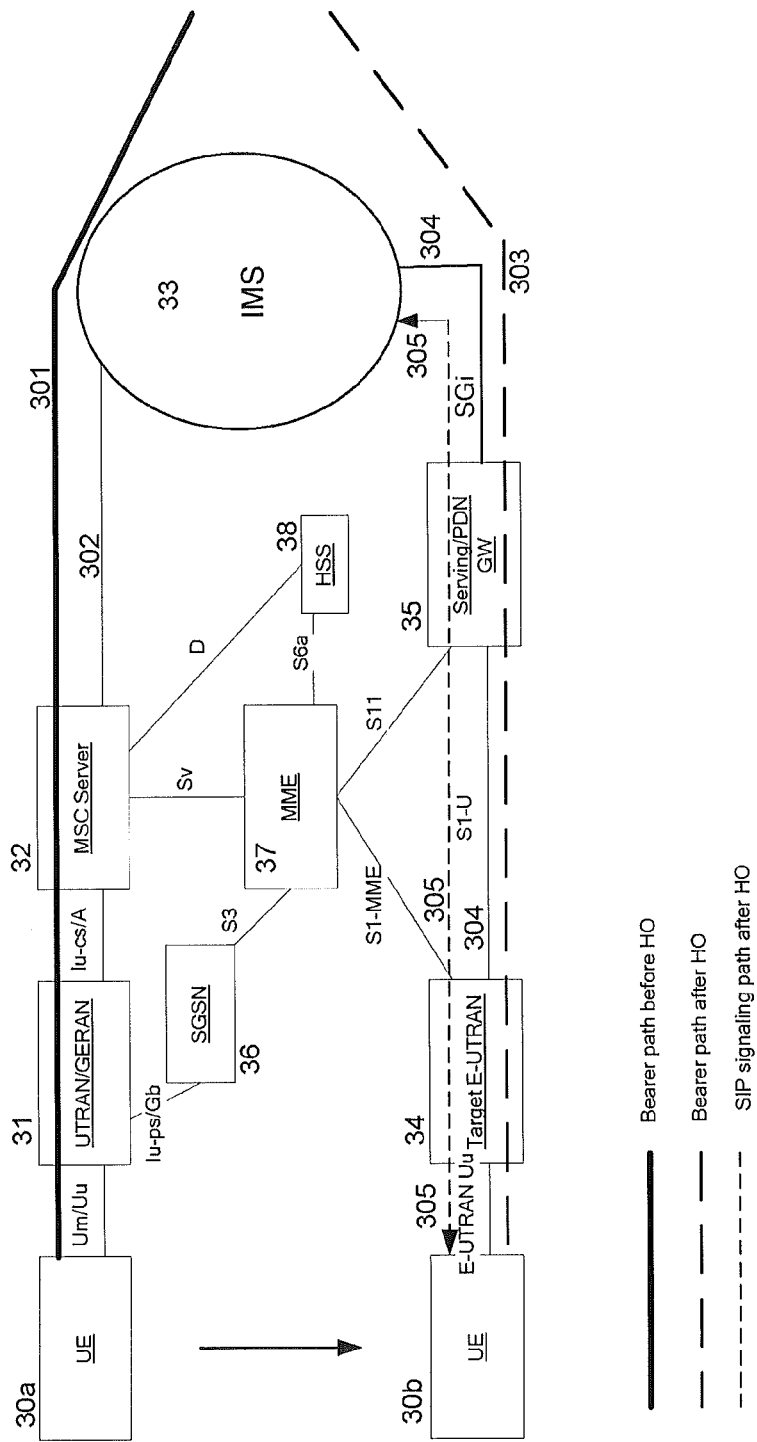
FIG. 3 illustrates schematically the interactions between network components involved in a handover from a CS access to a PS access with SRVCC.

FIG. 3 illustrates conceptually a handover of a UE 30, which is shown in a first situation 30a, prior to the handover, having established a call. The call is carried by bearers represented by solid line 301 to a terminating entity (which is not shown) over a CS (UTRAN/GERAN) access network 31 and a Mobile Switching Centre (MSC) Server 32 in the CS domain. The UE 30a is also attached to the IMS 33 as represented by line 302. After the handover, the UE 30 is shown in a second situation 30b, in which the call is carried by bearers represented by the dashed line 303 over a PS, E-UTRAN, access network 34 and Serving/Public data Network (PDN) gateways 35. The UE 30b remains attached to the IMS, as shown by solid line 304 and uses SIP signalling to communicate with the IMS, as represented by the dashed arrow-headed line 305. Also shown between the CS and PS access networks are a Serving GSN (SGSN) 36 a Mobile Management Entity (MME) 37 and the user's Home Subscriber Server (HSS) 38. These entities communicate with other entities over the referenced network interfaces. Note that although both the CS and PS access networks are shown in FIG. 3 communicating directly with the same SGSN 36 and MME 37, this is a simplification and in general each access network will communicate with a separate SGSN and MME associated with that access network. Thus, in a real practical deployment there would be either a source SGSN or a source MME associated with the source (in this case the CS) access network, and the same for the target (PS) network. The SGSN and MME can be separate nodes or co-located.

Figure 4:
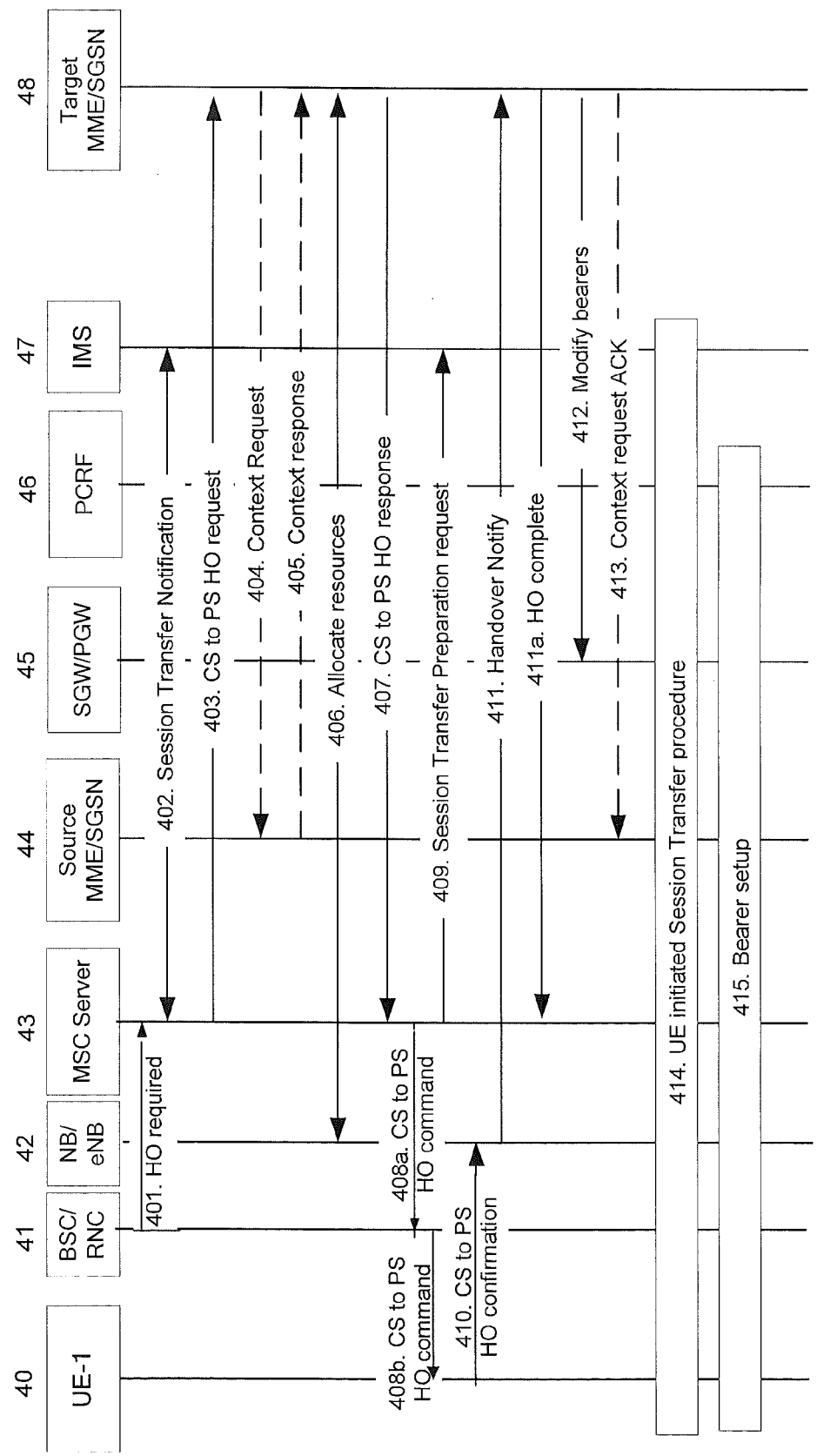
FIG. 4 is a signal diagram illustrating the procedure, as currently set out in 3GPP TS 23.216, for a CS to PS handover with SRVCC.

FIG. 4 shows the signalling involved in the handover process in accordance with TS 23.216 (version 11.2.0). The entities shown include a UE 40, which initially has a priority call set up over a CS access network represented here by a Radio Network Controller/Base Station Controller, RNC/BSC 41, that communicates with a MSC Server 43. The UE 40 is also anchored in an IMS network 47, which means that IMS sessions from and to the UE 40 are anchored at the Switching Control Centre (SCC) AS (not shown) in the UE subscriber's home IMS network so that the SCC AS sees all sessions and keeps track of them. Sessions are anchored at the SCC AS in the home IMS based on the subscriber's Initial Filter Criteria (iFC) provided by the HSS at registration. The handover procedure will require transferring the call to a PS access network, the entities of which include a NodeB (for Universal Mobile Telecommunications System, UMTS, network) or eNode B (for LTE/EPC network) 42 and a SGW/PGW 45. Also shown are a Source MME/SGSN 44 (see FIG. 3) with which the CS access network communicate, a Policy and Charging Rules Function (PCRF) 46, which triggers modification of the filters for the IMS signalling bearer when this is changed caused by a change in priority level, and a Target MME/SGSN 46 that communicates with the PS access network to which the call will be transferred.

Briefly, the procedure is as follows:

The CS access network, represented here by the RNC/BSC 41, sends a HO required signal 401 to the MSC Server 43 indicating that the call needs to be transferred to another access network. Signals 402 show the MSC Server 43 interacting with the IMS 47 according to standard procedures of TS 23.216. The MSC Server sends a SRVCC CS to PS HO request 403 to the Target MME according to standard procedures of TS 23.216. In signals 404 and 405 the target MME/SGSN 48 performs a context request if this is required according to standard procedures of TS 23.216. In signals 406, the target MME/SGSN 48 allocates resources for all PS bearers in the PS access network (e.g. E-UTRAN or UTRAN (High Speed Packet Access—HSPA)). Signals 407-411 a are the standard procedure of TS 23.216, in which the handover instruction (CS to PS HO command 408a, 408b) is sent back to the UE 40, which then completes its attachment to the PS access network. The Target MME/SGSN 48 sends Modify Bearer Request 412 to the SGW/PGW 45, to update PS bearer contexts according to the Inter Radio Access Technology handover (IRAT HO) procedure as specified in 3GPP TS 23.401. The target MME/SGSN 48 includes a CS to PS SRVCC indication, which is also provided to the PCRF 46 to trigger modification of the filters for the IMS signalling bearer. If the target MME/SGSN 48 has received a Context Request from the Source SGSN/MME 44 (signal 404), the target MME/SGSN 48 sends an Acknowledgment to the Context Response 413 to the Source SGSN/MME 44. At step 414, the UE 40 initiates the Session transfer procedures according to 3GPP TS 23.237. At step 415, as a result of the Session transfer procedures, the setup of a dedicated bearer for the call is performed according to the dedicated bearer activation procedure as specified in TS 23.401.

As previously explained, in the procedures specified and set out above, if the original call from the UE 40 was a priority call in the CS network, then this priority would be lost after the handover. Indeed, call priorities are handled and specified quite differently in CS and PS networks.

Figure 5:
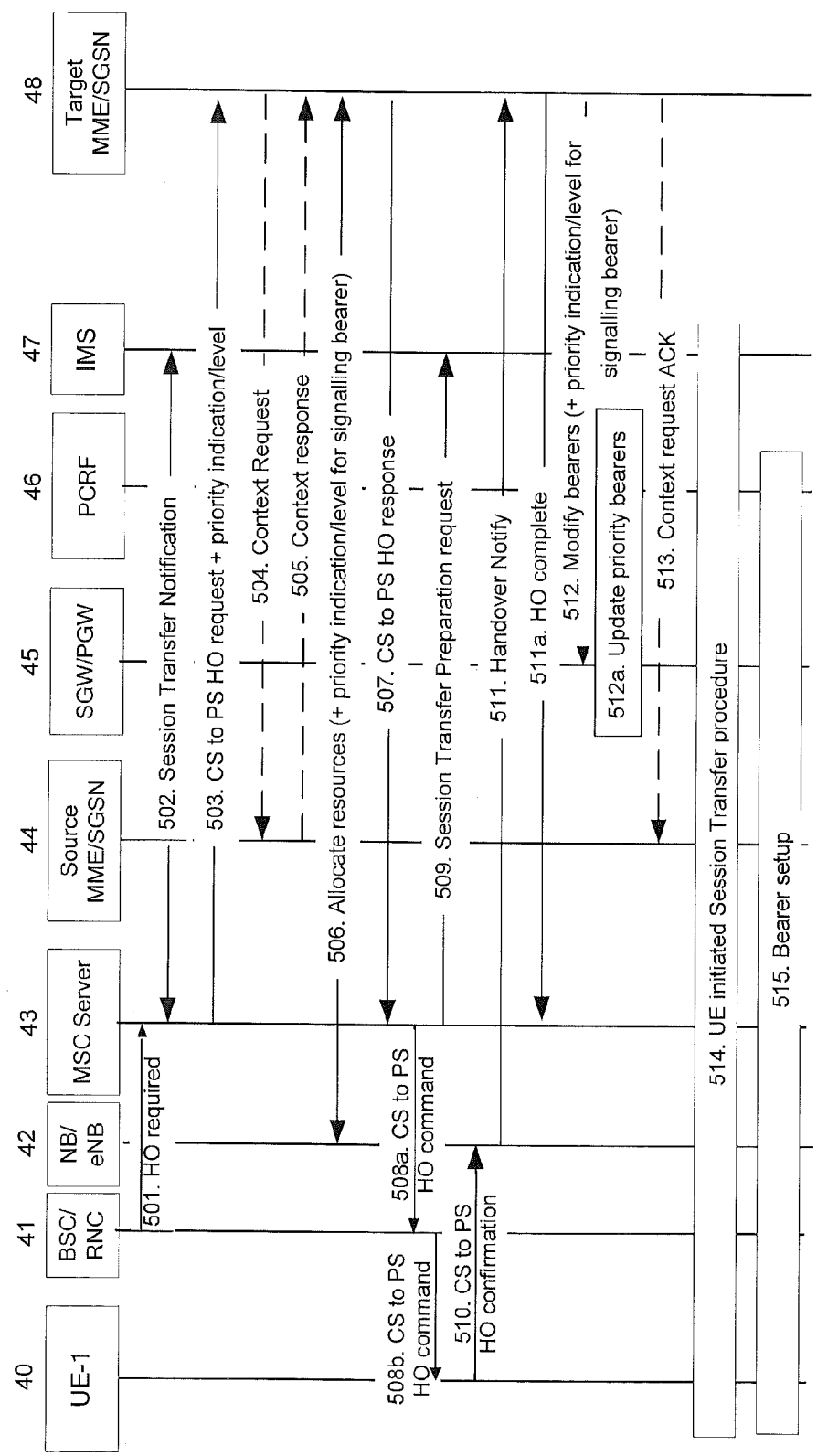
FIG. 5 is a signal diagram illustrating a procedure for a CS to PS handover with SRVCC of a priority call.

FIG. 5 illustrates the signalling in a procedure for transferring a priority call from a CS to a PS access network. Note that a priority call is assigned a priority level in the CS domain. At the outset UE 40 has a priority call established in the CS domain and the UE 40 is anchored in the IMS 47, such that both the MSC Server 43 and the IMS 47 have the understanding that it is a priority call. The MSC Server 43 stores a priority mapping between the CS priority levels and the IMS priority levels so that it can map the priority level of the call in the CS domain to the priority in the IMS 47. Similarly, when access transfer is performed, the priority level used at the MSC Server 43 (CS or IMS) is used to map to the priority level of the PS domain (e.g. EPC priority level used by the Target MME 48). A mapping, which may be a unique mapping, is defined between CS and IMS priorities, and also between the CS/IMS priority levels the PS (e.g. EPC) priority levels—note that these systems may use different values for defining priority levels.

The procedure shown in FIG. 5 involves the same network entities as shown in FIG. 4, which carry the same reference numerals, and some of the same signalling steps. Signals 501 and 502 are the same as signals 401 and 402 of FIG. 4. The MSC Server 43 then sends a SRVCC CS to PS HO request 503 to the Target MME/SGSN 48 according to standard procedures of TS 23.216. Additionally, in signal 503, the MSC Server 43 includes a priority indicator, including the CS (or IMS) priority level of the call. In this case, the Target MME/SGSN 48 maps the CS (or IMS) priority to the relevant priority level for the PS (EPC) network. Alternatively, the MSC Server 43 may map the priority level from the CS (or IMS) priority to the PS (EPC) priority level, and send the corresponding EPC priority to the Target MME/SGSN 48 directly.

Signals 504-505 are the same as signals 404-405 of FIG. 4. In signals 506, the Target MME/SGSN 48 allocates resources for all PS bearers in the PS access network by an exchange of messages with the NodeB or eNodeB, but in this case the resources are determined, at least in part, by the required priority level of the call. Optionally, the Target MME/SGSN 48 may change the priority of the IMS signalling bearer during this time by indicating the EPC priority level required for the IMS Signalling bearer as part of the resource allocation procedures. Alternatively, the priority of the IMS signalling bearer may be altered later (see step 512*a* below).

Signals 507-511*a* are the same as 407-411*a* shown in FIG. 4 and accord with the standard procedures of TS 23.216. However, in one alternative embodiment the HO command signals 508*a*, 508*b* may include the IMS priority level to be used for the IMS signalling bearer after handover (see step 514 below). The Target MME/SGSN 48 then sends a Modify Bearer Request 512 to the SGW/PGW 45 to update the PS bearer contexts according to the IRAT HO procedure as specified in TS 23.401. The Target MME/SGSN 48 includes the CS to PS SRVCC indication, and if the required priority level of the bearer was not set in step 506, it also includes the PS priority level required. At this stage, the CS to PS indication is also provided to the PCRF 46, together with the EPC priority level if this was provided in signal 512. This triggers modification of the filters for the IMS signalling bearer to change the EPC priority level of the signalling bearer so that it corresponds to the priority level previously used in the CS domain (and/or IMS). Signal 513 is the same as signal 413 in FIG. 4.

At step 514, the UE initiates the Session transfer procedures as specified in TS 23.237, and in addition the UE includes the corresponding IMS priority level in the IMS signalling. There are two ways that the UE may obtain the IMS priority level: 1) the IMS priority level is provided through the HO command signals 508*a/b* to the UE; or 2) the UE derives the IMS priority level itself from the CS priority level (which it knows), in which case the UE stores the same priority level mapping as the MSC server. When setting up the media bearer resources for the call, a P-CSCF (not shown) in the IMS network interacts with the PCRF 46 and uses the IMS priority level for authorizing resources.

At step 515, as a result of the Session transfer procedures, the setup of a dedicated bearer for the priority call is performed according to the dedicated bearer activation procedure as specified in TS 23.401. The dedicated bearer is allocated a priority level based on the received IMS priority level.

Figure 6:
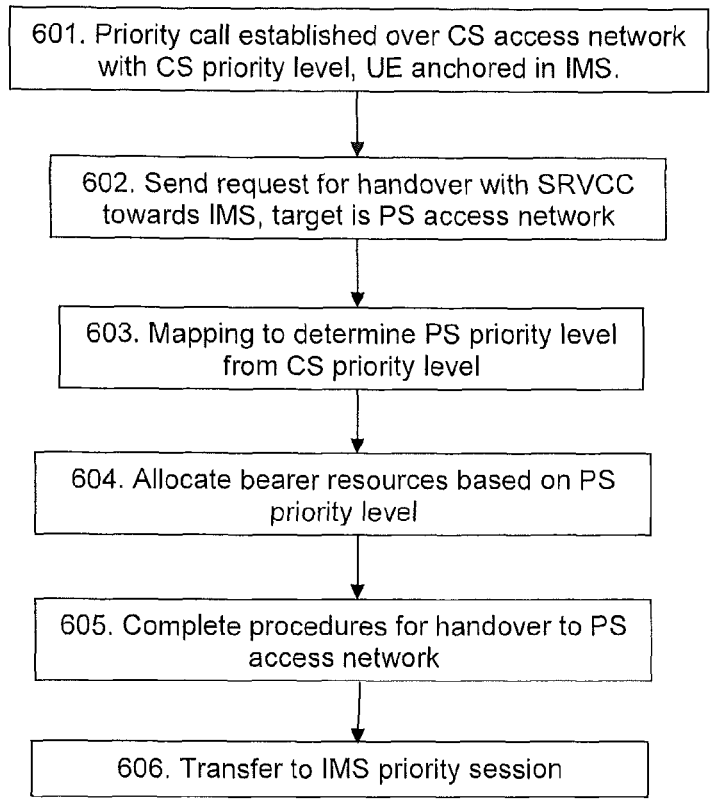
FIG. 6 is a flow diagram illustrating the principal method steps in a method of CS to PS handover with SRVCC of a priority call.

FIG. 6 is a flow diagram illustrating the principal method steps of the procedure described above for a method of handing over, a priority call from a CS access network to a target PS access network with SRVCC. At step 601 the priority call is established over the CS access network with a specified CS priority level, and the call is anchored in the IMS. At step 602 a request for handover with SRVCC is sent from the CS access network towards the IMS network to transfer the priority call to a target PS access network. At step 603 a mapping is performed to determine a PS priority level for the session in the PS access network based on the specified CS priority level. At step 604 bearer resources for the session allocated, the bearer resources being based, at least in part, on the determined PS priority level. At step 605 the handover procedures are completed. Finally at step 606 the priority call is transferred to the IMS priority session over the PS access network.

Figure 7:
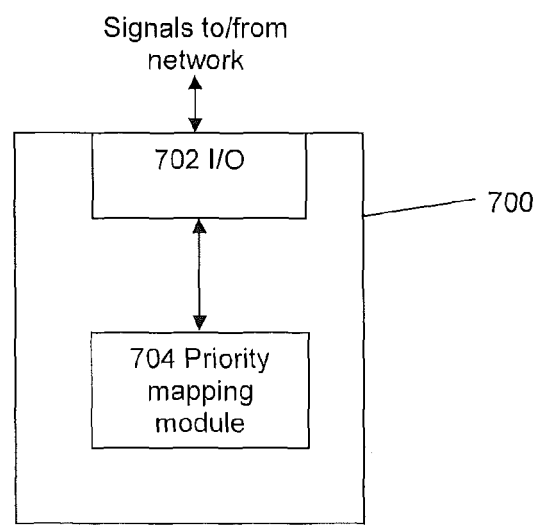
FIG. 7 is a schematic block diagram of a network server.

FIG. 7 is a schematic block diagram of a network server 700 configured for the implementation of the CS to PS handover procedure with SRVCC of a priority call. The network server 700 includes an input/output 702 for receiving and sending signals to other network entities, and a priority mapping module 704 that determines the PS priority level, based on a specified CS priority level of the call. The signals received at the input/output 702 include a signal that includes an indication of the specified CS priority level of the priority call. The signals sent via the input/output 702 include a signal that includes the determined PS priority level.

Figure 8:
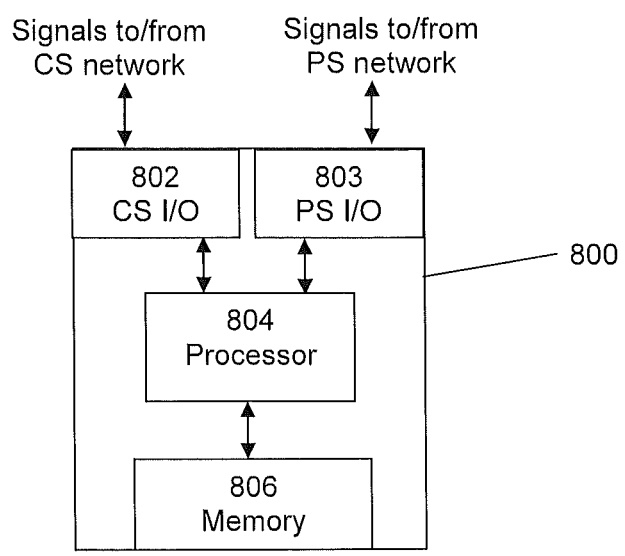
FIG. 8 is a schematic block diagram of a UE.

FIG. 8 is a schematic block diagram of a UE 800 configured for the implementation of the CS to PS handover procedure with SRVCC of a priority call. The UE 800 includes an input/output 802 for receiving and transmitting signals via a CS access network, and an input/output 803 for receiving and transmitting signals via a PS access network. The UE 800 also includes a memory 806 storing data and program instructions. A processor 804 is configured to process the program instructions to store in the memory 806 an indication of an IMS priority level that corresponds to the specified CS priority level of the call. The processor 804 is also configured to include the IMS priority level in IMS signalling sent to the IMS network to transfer the call with SRVCC by establishing an IMS priority session.

The procedures and associated configuration of the UE and network entities described above allow handover of a priority call from a CS access to a PS access with SRVCC such that the priority of the call in the CS domain is retained with an equivalent or corresponding priority in the PS domain.

The invention claimed is:

1. A method of handing over with Single Radio Voice Call Continuity, SRVCC, a priority call from a User Equipment, UE, accessing an IP Multimedia Subsystem, IMS, network via a Circuit Switched, CS, access network to a target Packet Switched, PS, access network thereby establishing a priority IMS session, wherein the priority call has a specified CS priority level, the method comprising:
    sending a handover request from the CS access network towards the PS access network and the IMS network to transfer the priority call, wherein the handover request is sent from the CS access network to a Mobile Switching Centre, MSC, server;
    determining a PS priority level for the priority IMS session in the PS network based on a mapping operation performed by the MSC server to determine the PS priority level based on the specified CS priority level;
    forwarding, from the MSC server, the handover request together with the determined PS priority level to the target PS network;
    sending an indication of the requested CS to PS handover with SRVCC together with the determined PS priority level to a Policy and Charging Rules Function, PCRF, network component to change the IMS signaling bearer resources to correspond to the PS priority level;
    allocating bearer resources for the priority IMS session, wherein the bearer resources are allocated in response to the PS priority level; and
    transferring the call to the priority IMS session over the PS access network.

2. The method of claim 1 further comprising determining an IMS priority level for the priority IMS session in response to the specified CS priority level.

3. The method of claim 2, further comprising determining the PS priority level from the IMS priority level.

4. The method of claim 1, wherein allocating bearer resources comprises providing an indication of the IMS signaling bearer resources required for the determined PS priority level.

5. The method of claim 1, further comprising:
    determining an IMS priority level by the UE from the priority level used for the CS call; and
    providing the determined IMS priority level in signaling from the UE to initiate the IMS session.

6. The method of claim 1 wherein the PS priority level is an Evolved Packet Core, EPC, priority level used in an EPC network.

7. A method of handing over with Single Radio Voice Call Continuity, SRVCC, a priority call from a User Equipment, UE, accessing an IP Multimedia Subsystem, IMS, network via a Circuit Switched, CS, access network to a target Packet Switched, PS, access network thereby establishing a priority IMS session, wherein the priority call has a specified CS priority level, the method comprising:
    sending a handover request from the CS access network towards the PS access network and the IMS network to transfer the priority call, wherein the handover request is sent from the CS access network to a Mobile Switching Centre, MSC, server;
    determining a PS priority level for the priority IMS session in the PS network based on the specified CS priority level;
    forwarding the handover request together with the CS priority level, or the determined IMS priority level, to the target PS network;
    sending an indication of the requested CS to PS handover with SRVCC together with the determined PS priority level to a Policy and Charging Rules Function, PCRF, network component to change the IMS signaling bearer resources to correspond to the PS priority level;
    allocating bearer resources for the priority IMS session, wherein the bearer resources are allocated in response to the PS priority level; and
    transferring the call to the priority IMS session over the PS access network.

8. The method of claim 7, further comprising determining the PS priority level at the target PS network from the CS or IMS priority level received with the handover request.

9. A method of handing over with Single Radio Voice Call Continuity, SRVCC, a priority call from a User Equipment, UE, accessing an IP Multimedia Subsystem, IMS, network via a Circuit Switched, CS, access network to a target Packet Switched, PS, access network thereby establishing a priority IMS session, wherein the priority call has a specified CS priority level, the method comprising:
    sending a handover request from the CS access network towards the PS access network and the IMS network to transfer the priority call;
    determining a PS priority level for the priority IMS session in the PS network based on the specified CS priority level;
    allocating bearer resources for the priority IMS session, wherein the bearer resources are allocated in response to the PS priority level;
    transferring the call to the priority IMS session over the PS access network;
    providing a determined IMS priority level to the UE as part of a handover command; and
    providing the determined IMS priority level in signaling from the UE to initiate the IMS session.

10. A computer program in a non-transitory memory and configured to be executed by a processor of the computer to cause the computer in a network to perform hand over with Single Radio Voice Call Continuity, SRVCC, of a priority call from a User Equipment, UE, accessing an IP Multimedia Subsystem, IMS, network via a Circuit Switched, CS, access network to a target Packet Switched, PS, access network, thereby establishing a priority IMS session, wherein the priority call has a specified CS priority level, the computer program is further configured to perform the hand over including by:
    sending a handover request from the CS access network towards the PS access network and the IMS network to transfer the priority call, wherein the handover request is sent from the CS access network to a MSC server;
    determining a PS priority level for the priority IMS session in the PS network based on a mapping operation performed by the MSC server to determine the PS priority level based on the specified CS priority level;
    forwarding, from the MSC server, the handover request together with the determined PS priority level to the target PS network;

sending an indication of the requested CS to PS handover with SRVCC together with the determined PS priority level to a Policy and Charging Rules Function, PCRF, network component to change the IMS signaling bearer resources to correspond to the PS priority level;

allocating bearer resources for the priority IMS session, wherein the bearer resources are allocated in response to the PS priority level; and transferring the call to the priority IMS session over the PS access network.

* * * * *

UNITED STATES PATENT AND TRADEMARK OFFICE
CERTIFICATE OF CORRECTION

PATENT NO. : 8,908,643 B2  Page 1 of 1
APPLICATION NO. : 13/392366
DATED : December 9, 2014
INVENTOR(S) : Keller et al.

It is certified that error appears in the above-identified patent and that said Letters Patent is hereby corrected as shown below:

On the Title Page, in the Figure, delete " 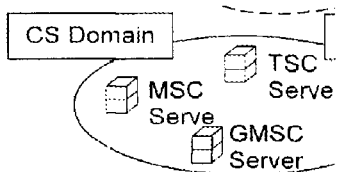, " and insert -- 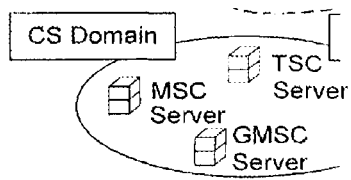 --, therefor.

In The Drawings

Figure 1:
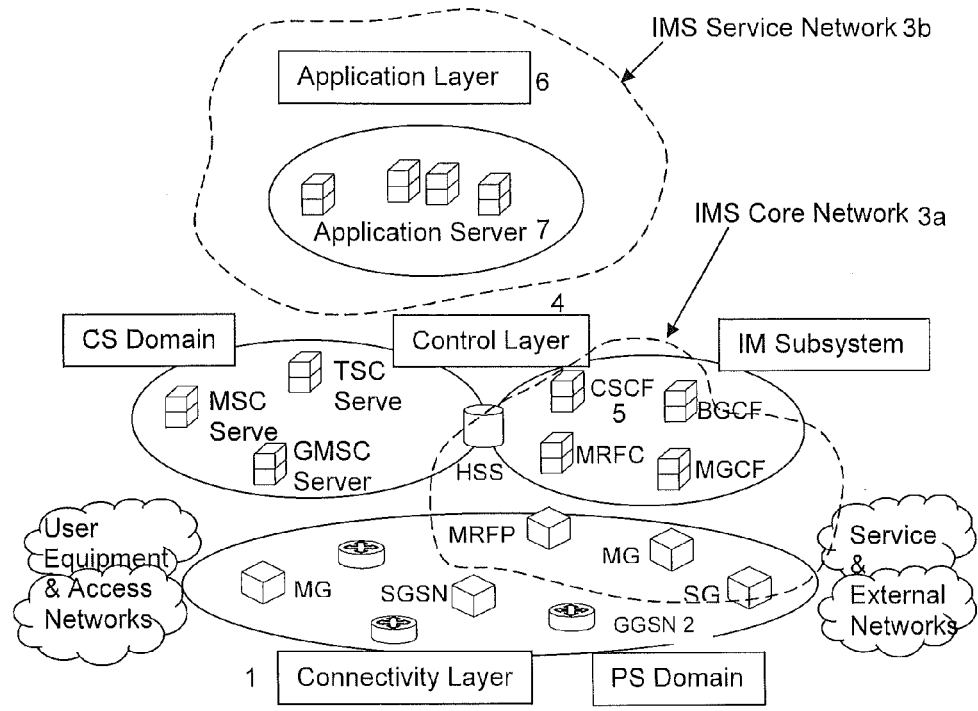
FIG. 1 illustrates schematically an IMS network in association with a mobile network architecture of a General Packet Radio Service (GPRS) access network.
Figure 2:
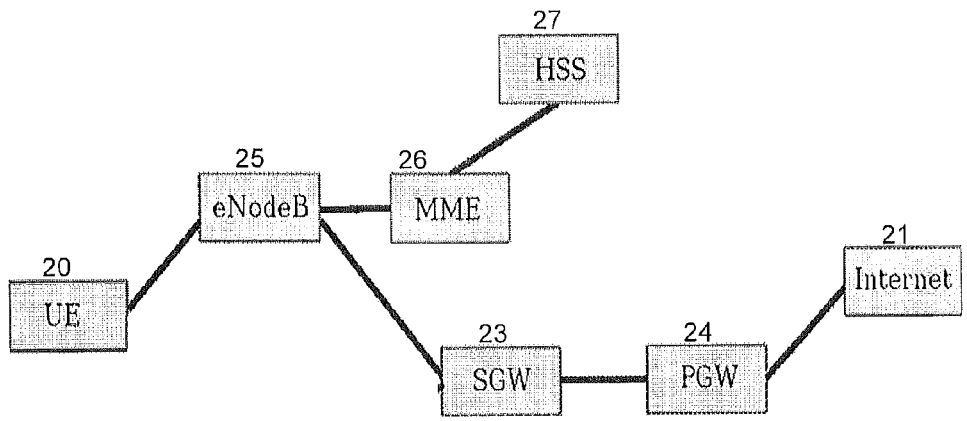
FIG. 2 illustrates schematically the components of a PS access network in accordance with the 3GPP defined Systems Architecture Evolution (SAE)

In Fig. 1, Sheet 1 of 6, delete " 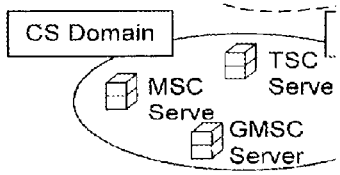 " and insert -- 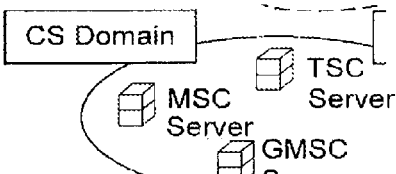 --, therefor.

Signed and Sealed this
Fourth Day of August, 2015

Michelle K. Lee
*Director of the United States Patent and Trademark Office*